United States Patent
Ebadi Shahrivar et al.

(10) Patent No.: US 12,009,892 B2
(45) Date of Patent: Jun. 11, 2024

(54) ANTENNA SELECTION TECHNIQUES FOR UPLINK AND DOWNLINK WIRELESS COMMUNICATIONS

(71) Applicant: QUALCOMM Incorporated, San Diego, CA (US)

(72) Inventors: Arash Ebadi Shahrivar, San Diego, CA (US); Peter Pui Lok Ang, San Diego, CA (US); Brian Clarke Banister, San Diego, CA (US); Yung-Yih Jian, Campbell, CA (US); Jianming Zhu, Acton, MA (US); Raghu Narayan Challa, San Diego, CA (US); Alexei Yurievitch Gorokhov, San Diego, CA (US); Aamod Khandekar, San Diego, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/345,548

(22) Filed: Jun. 30, 2023

(65) Prior Publication Data
US 2023/0344484 A1    Oct. 26, 2023

Related U.S. Application Data

(63) Continuation of application No. 17/826,865, filed on May 27, 2022, now Pat. No. 11,728,863.
(Continued)

(51) Int. Cl.
*H04L 5/12* (2006.01)
*H04B 7/06* (2006.01)
*H04B 7/08* (2006.01)

(52) U.S. Cl.
CPC ......... *H04B 7/0623* (2013.01); *H04B 7/0608* (2013.01); *H04B 7/0632* (2013.01); *H04B 7/0802* (2013.01)

(58) Field of Classification Search
CPC ... H04B 7/0608; H04B 17/309; H04B 7/0693
(Continued)

(56) References Cited

U.S. PATENT DOCUMENTS

| 11,728,863 B2 | 8/2023 | Ebadi Shahrivar et al. |
| 2009/0016372 A1* | 1/2009 | Tao ................. H04L 5/0007 370/437 |

(Continued)

OTHER PUBLICATIONS

International Search Report and Written Opinion—PCT/US2022/040436—ISA/EPO—dated Nov. 8, 2022.

*Primary Examiner* — Zewdu A Kassa
(74) *Attorney, Agent, or Firm* — Dalei Dong; Holland & Hart LLP

(57) ABSTRACT

Methods, systems, and devices for wireless communications are described that provide for antenna selection at a user equipment (UE). The UE may have a set of available antennas for uplink and downlink communications, and may select a first subset of antennas for uplink communications and a second subset of antennas for downlink communications. The first subset of antennas may be based on one or more uplink metrics, and the second subset of antennas may be based on the first subset of antennas and one or more downlink channel metrics, traffic amounts, or any combinations thereof.

30 Claims, 10 Drawing Sheets

Related U.S. Application Data

(60) Provisional application No. 63/243,946, filed on Sep. 14, 2021.

(58) Field of Classification Search
USPC .............. 375/267, 262, 259, 219, 295, 316
See application file for complete search history.

(56) References Cited

U.S. PATENT DOCUMENTS

| | | |
|---|---|---|
| 2013/0225223 A1 | 8/2013 | Nukala et al. |
| 2017/0373398 A1 | 12/2017 | Komulainen et al. |
| 2023/0080068 A1 | 3/2023 | Ebadi Shahrivar et al. |

\* cited by examiner

Reference Signal(s) 215

Measurement Report 220

ANTENNA SELECTION TECHNIQUES FOR UPLINK AND DOWNLINK WIRELESS COMMUNICATIONS

CROSS REFERENCE

The present Application for Patent is a Continuation of U.S. patent application Ser. No. 17/826,865 by EBADI SHAHRIVAR et al., entitled "ANTENNA SELECTION TECHNIQUES FOR UPLINK AND DOWNLINK WIRELESS COMMUNICATIONS," filed May 27, 2022, which claims the benefit of U.S. Provisional Patent Application No. 63/243,946 by EBADI SHAHRIVAR et al., entitled "ANTENNA SELECTION TECHNIQUES FOR UPLINK AND DOWNLINK WIRELESS COMMUNICATIONS," filed Sep. 14, 2021, assigned to the assignee hereof, and expressly incorporated by reference herein.

FIELD OF TECHNOLOGY

The following relates to wireless communications, including antenna selection techniques for uplink and downlink wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may communicate with a base station or access network entity using uplink and downlink communications, in which different antennas may be used for uplink transmissions and for downlink receptions. In such systems, it may be appropriate for the UE to support techniques for antenna switching between uplink antennas and downlink antennas.

SUMMARY

The described techniques relate to improved methods, systems, devices, and apparatuses that support antenna selection techniques for uplink and downlink wireless communications. In accordance with various aspects, the described techniques provide for antenna selection at a user equipment (UE) with efficient switching between antennas used for uplink communications and downlink communications. In some cases, a UE may have a set of available antennas for uplink and downlink communications, and may select a first subset of antennas for uplink communications and a second subset of antennas for downlink communications. The first subset may be based on one or more uplink metrics, and the second subset may be based on the first subset of antennas and one or more downlink channel metrics, an amount of downlink traffic, an amount of uplink traffic, or any combinations thereof. In some cases, more downlink antennas may be used than uplink, and the UE may select one or more antennas for inclusion in the second subset, where the antennas of the first subset are included in the second subset. By including the first subset in the second subset of antennas, the associated transmit/receive chain components of the common antennas do not need to be switched on and off between uplink and downlink transmissions, and power consumption can be reduced. In cases where a same number of antennas are used for uplink and downlink transmissions, the antennas may be selected based on a traffic load, priority of uplink and downlink transmissions, one or more channel metrics, or any combinations thereof.

A method for wireless communication at a user equipment (UE) is described. The method may include identifying one or more uplink channel metrics associated with an uplink channel between the UE and an access network entity, measuring one or more downlink channel metrics associated with a downlink channel between the UE and the access network entity, identifying an amount of downlink traffic and an amount of uplink traffic for communications between the UE and the access network entity, configuring, from a set of available antennas, a first subset of antennas for transmitting uplink communications to the access network entity based on the one or more uplink channel metrics, configuring, from the set of available antennas, a second subset of antennas for receiving downlink communications from the access network entity based on the first subset of antennas, the one or more downlink channel metrics, the amount of downlink traffic, and the amount of uplink traffic, and communicating with the access network entity using the first subset of antennas for uplink transmissions and the second subset of antennas for downlink transmissions.

An apparatus for wireless communication at a UE is described. The apparatus may include a processor, memory coupled with the processor, and instructions stored in the memory. The instructions may be executable by the processor to cause the apparatus to identify one or more uplink channel metrics associated with an uplink channel between the UE and an access network entity, measure one or more downlink channel metrics associated with a downlink channel between the UE and the access network entity, identify an amount of downlink traffic and an amount of uplink traffic for communications between the UE and the access network entity, configure, from a set of available antennas, a first subset of antennas for transmitting uplink communications to the access network entity based on the one or more uplink channel metrics, configure, from the set of available antennas, a second subset of antennas for receiving downlink communications from the access network entity based on the first subset of antennas, the one or more downlink channel metrics, the amount of downlink traffic, and the amount of uplink traffic, and communicate with the access network entity using the first subset of antennas for uplink transmissions and the second subset of antennas for downlink transmissions.

Another apparatus for wireless communication at a UE is described. The apparatus may include means for identifying one or more uplink channel metrics associated with an uplink channel between the UE and an access network entity, means for measuring one or more downlink channel metrics associated with a downlink channel between the UE and the access network entity, means for identifying an amount of downlink traffic and an amount of uplink traffic for communications between the UE and the access network entity, means for configuring, from a set of available antennas, a first subset of antennas for transmitting uplink communications to the access network entity based on the one or more uplink channel metrics, means for configuring, from the set of available antennas, a second subset of antennas for receiving downlink communications from the access network entity based on the first subset of antennas, the one or more downlink channel metrics, the amount of downlink traffic, and the amount of uplink traffic, and means for communicating with the access network entity using the first subset of antennas for uplink transmissions and the second subset of antennas for downlink transmissions.

A non-transitory computer-readable medium storing code for wireless communication at a UE is described. The code may include instructions executable by a processor to identify one or more uplink channel metrics associated with an uplink channel between the UE and an access network entity, measure one or more downlink channel metrics associated with a downlink channel between the UE and the access network entity, identify an amount of downlink traffic and an amount of uplink traffic for communications between the UE and the access network entity, configure, from a set of available antennas, a first subset of antennas for transmitting uplink communications to the access network entity based on the one or more uplink channel metrics, configure, from the set of available antennas, a second subset of antennas for receiving downlink communications from the access network entity based on the first subset of antennas, the one or more downlink channel metrics, the amount of downlink traffic, and the amount of uplink traffic, and communicate with the access network entity using the first subset of antennas for uplink transmissions and the second subset of antennas for downlink transmissions.

In some examples of the method, apparatuses, and non-transitory computer-readable medium described herein, the one or more uplink channel metrics may be identified based on a reference signal received power (RSRP) of one or more reference signals from the access network entity that is measured for each antenna of the set of available antennas. In some examples of the method, apparatuses, and non-transitory computer-readable medium described herein, the RSRP may be measured from one or more of a synchronization signal block (SSB), a tracking reference signal (TRS), a channel state information (CSI) reference signal, or any combinations thereof.

In some examples of the method, apparatuses, and non-transitory computer-readable medium described herein, the one or more downlink channel metrics include a channel capacity estimate associated with each antenna of the set of available antennas. In some examples of the method, apparatuses, and non-transitory computer-readable medium described herein, the channel capacity estimate may be based on a spectral efficiency measurement, a signal to noise measurement, or a RSRP measurement associated with each antenna of the set of available antennas.

In some examples of the method, apparatuses, and non-transitory computer-readable medium described herein, the second subset of antennas includes more antennas than the first subset of antennas, and where each of the antenna of the first subset of antennas is included in the second subset of antennas. In some examples of the method, apparatuses, and non-transitory computer-readable medium described herein, the first subset of antennas are configured to include antennas of the set of available antennas that have more favorable uplink channel metrics, and one or more remaining antennas of the set of available antennas are configured for inclusion in the second subset of antennas based on respective downlink channel metrics. In some examples of the method, apparatuses, and non-transitory computer-readable medium described herein, the one or more remaining antennas include a first antenna that is selected for inclusion in the second subset of antennas based on one or more combined metrics of the first antenna and one or more antennas of the first subset of antennas.

In some examples of the method, apparatuses, and non-transitory computer-readable medium described herein, the first subset of antennas includes a same number of antennas as the second subset of antennas, and where a same subset of antennas of the set of available antennas may be configured for both the first subset of antennas and the second subset of antennas. In some examples of the method, apparatuses, and non-transitory computer-readable medium described herein, the antennas of the same subset of antennas are configured based on a threshold value that is associated with a difference between the amount of downlink traffic and the amount of uplink traffic, and one or more of the uplink channel metrics, the downlink channel metrics, or a priority associated with the uplink communications and the downlink communications. In some examples of the method, apparatuses, and non-transitory computer-readable medium described herein, the priority associated with the uplink communications and the downlink communications may be selected based on a RSRP that is measured for one or more antennas of the set of available antennas. In some examples of the method, apparatuses, and non-transitory computer-readable medium described herein, the antennas of the same subset of antennas is configured based on uplink channel metrics or downlink channel metrics, and a comparison of one or more linear combinations of uplink channel metrics and downlink channel metrics with a threshold.

DETAILED DESCRIPTION

Figure 1:
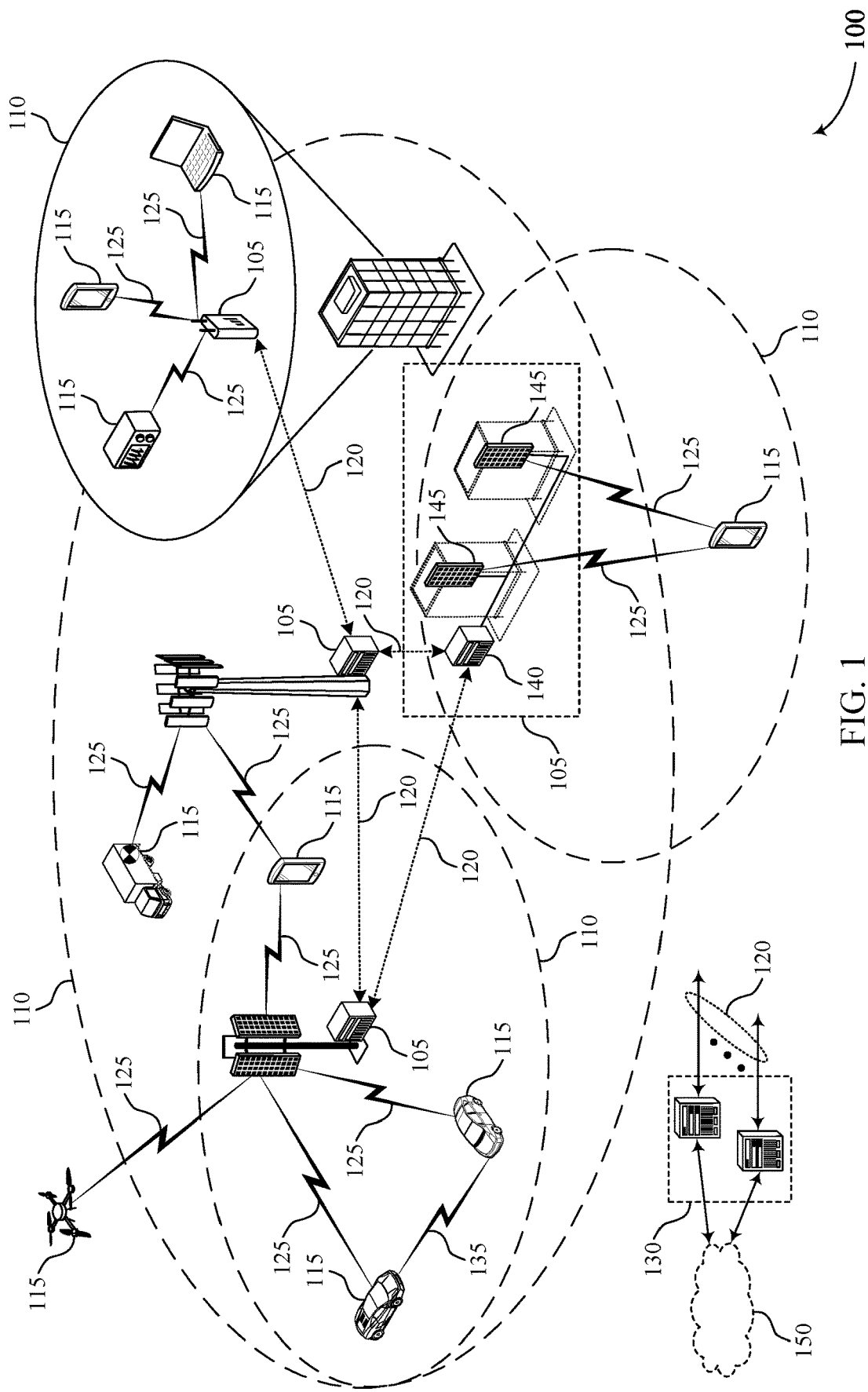
FIG. 1 illustrates an example of a wireless communications system that supports antenna selection techniques for uplink and downlink wireless communications in accordance with aspects of the present disclosure.

In some wireless communications systems, a user equipment (UE) may communicate with a base station or access network entity using multiple-input multiple-output (MIMO) communications in which multiple antennas may be used for uplink communications, downlink communications, or both. In some cases, fewer uplink antenna elements are used than downlink antenna elements (e.g., due to power consumption associated with additional uplink transmit chains). When selecting antenna elements, a UE may select from a set of available antennas (e.g., multiple antenna elements that are available at one or more antenna panels of the UE). Existing UEs may select uplink and downlink antennas from the set of available antenna elements without regard to whether a particular antenna has been selected already for use in uplink or downlink communications. This can result in a UE having to switch different antennas on and off for uplink and downlink communications, which can result in unnecessary power consumption. In various aspects of the present disclosure, antenna selection may be made such that fewer antennas and associated transmit/receive chain circuitry need to be switched between uplink and downlink communications, which may help reduce power consumption at the UE. In some cases, there may be advantages in using a same physical antenna for both uplink and downlink, because of reciprocity of uplink and downlink channels. This can result in improvement in both uplink and downlink performance, since uplink and downlink channels at a particular antenna are the same, and channel state feedback captures both of them.

In accordance with various aspects, the techniques are described for antenna selection at a UE with for efficient switching between antennas used for uplink communications and antennas used for downlink communications. In some cases, a UE may have a set of available antennas for uplink and downlink communications, and may select a first subset of antennas for uplink communications based on one or more uplink metrics. One or more antennas for a second subset of antennas for downlink communications may be selected based on the first subset of antennas and one or more downlink channel metrics, an amount of downlink traffic, an amount of uplink traffic, or any combinations thereof. In some cases, more downlink antennas may be used than uplink antennas, and the UE may select one or more antennas for inclusion in the second subset, where the antennas of the first subset are included in the second subset. By including the first subset in the second subset of antennas, the associated transmit/receive chain components of the common antennas do not need to be switched on and off between uplink and downlink transmissions, and power consumption can be reduced. As discussed, there may be advantages in using a same physical antenna for both uplink and downlink, because of reciprocity of uplink and downlink channels. This can result in improvement in both uplink and downlink performance, since uplink and downlink channels at a particular antenna are the same, and channel state feedback captures both of them. In cases where a same number of antennas are used for uplink and downlink transmissions, the antennas may be selected based on a traffic load, priority of uplink and downlink transmissions, one or more channel metrics, or any combinations thereof.

Techniques as discussed herein may thus provide for more efficient antenna management for wireless communications. For example, implementation of antenna selection techniques at a UE may mitigate frequent antenna and receive chain switching that may occur when different subsets of antennas are used for uplink and downlink communications. Such techniques may thus enhance UE efficiency and reduce power consumption, which may help to increase battery life.

Aspects of the disclosure are initially described in the context of wireless communications systems. Examples of antenna modules and antenna selection techniques are then described. Aspects of the disclosure are further illustrated by and described with reference to apparatus diagrams, system diagrams, and flowcharts that relate to antenna selection techniques for uplink and downlink wireless communications.

FIG. 1 illustrates an example of a wireless communications system 100 that supports antenna selection techniques for uplink and downlink wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a UE 115 may have a set of available antennas for uplink and downlink communications, and may select a first subset of antennas for uplink communications and a second subset of antennas for downlink communications. The first subset may be based on one or more uplink metrics, and the second subset may be based on the first subset of antennas and one or more downlink channel metrics, an amount of downlink traffic, an amount of uplink traffic, or any combinations thereof. In some cases, more downlink antennas may be used than uplink, and the UE 115 may select one or more antennas for inclusion in the second subset, where the antennas of the first subset are included in the second subset. In cases where a same number of antennas are used for uplink and downlink transmissions, the antennas may be selected based on a traffic load, priority of uplink and downlink transmissions, one or more channel metrics, or any combinations thereof.

Figure 2:
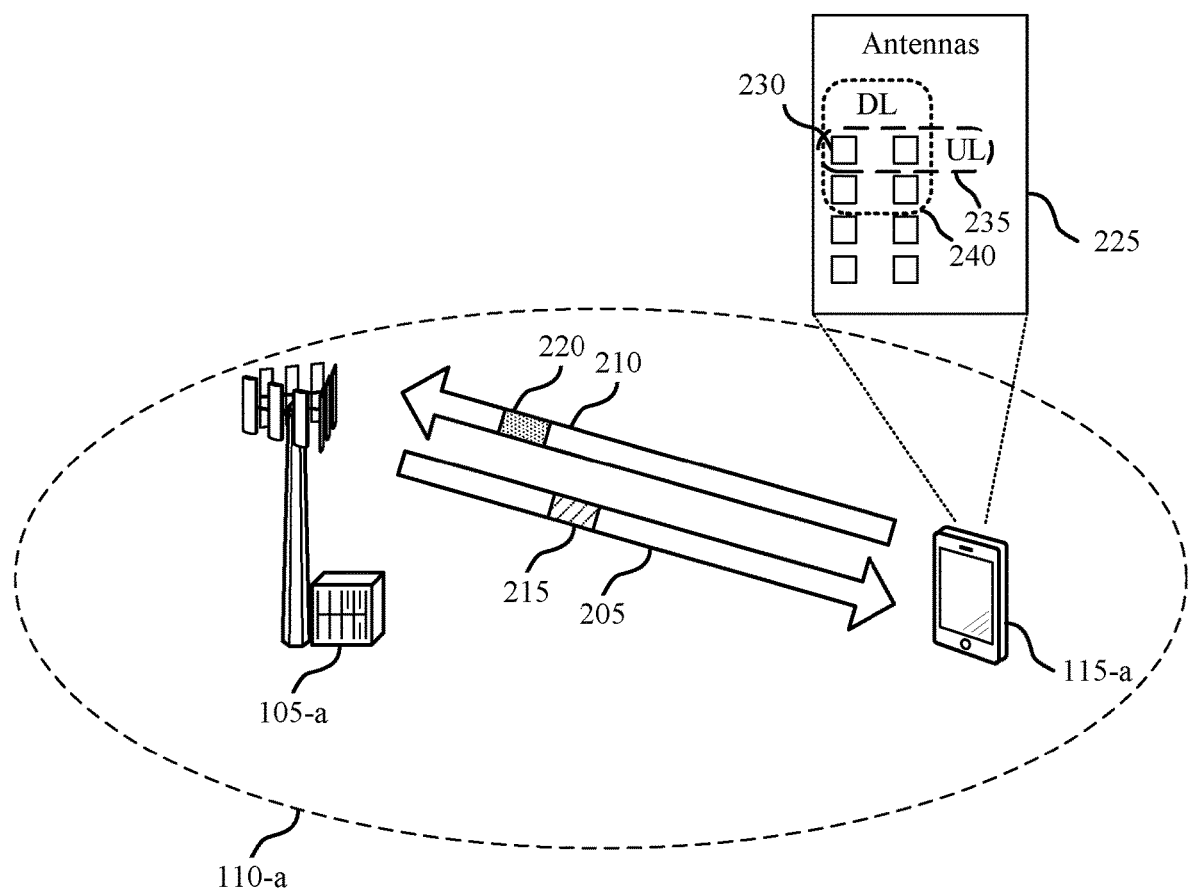
FIG. 2 illustrates an example of a portion of a wireless communications system that supports antenna selection techniques for uplink and downlink wireless communications in accordance with aspects of the present disclosure.
Figure 2:
Figure 2:

FIG. 2 illustrates an example of a wireless communications system 200 that supports antenna selection techniques for uplink and downlink wireless communications in accordance with aspects of the present disclosure. In some examples, wireless communications system 200 may implement aspects of wireless communications system 100. In the example of FIG. 2, wireless communications system 200 may include base station 105-a and UE 115-a, which may be examples of the corresponding devices described with respect to FIG. 1. Base station 105-a may provide network coverage for geographic coverage area 110-a. The base station 105-a may transmit downlink communications 205 to the UE 115-a, and the UE 115-a may transmit uplink communications 210 to the base station 105-a.

To support communications between base station 105-a and UE 115-a, the base station 105-a may transmit one or more reference signals 215 (e.g., channel state information (CSI) reference signals, synchronization signal blocks (SSBs), demodulation reference signals (DMRSs), tracking reference signals (TRSs), and the like). The UE 115-a may measure one or more metrics of received reference signals 215 and provide a measurement report 220 to the base station 105-a. The UE 115-a, in some case, may identify one or more antennas for use in uplink and downlink communications based on one or more metrics from the measurements of the reference signals 215. For example, the UE 115-a may have an antenna system 225 that includes a number of antenna elements 230 that form a set of available antenna elements 230. In some cases, the antenna system 225 may include one or more antenna panels that may each include a number of antenna elements 230. While eight antenna elements 230 (e.g., on an 8-element antenna panel) are illustrated in FIG. 2, other UEs may have more or fewer antennas.

In some cases, a UE 115-*a* may have K physical antennas, and use N antennas for uplink communications and M antennas for downlink communications. The N antennas for uplink communications may be an example of a first subset of antenna elements, and the M antennas for downlink communications may be an example of a second subset of antenna elements. In the example of FIG. 2, a first subset of antenna elements 235 for uplink communications may include two antenna elements 230, and a second subset of antenna elements 240 for downlink communications may include four antenna elements 230. In accordance with various techniques, the first subset of antenna elements and the second subset of antenna elements may be selected out of the K physical antennas based on one or more antenna selection metrics, wherein antenna selection metrics in uplink and downlink may not be the same. As discussed herein, it may be advantageous in some cases to use a same physical antenna for both uplink and downlink (e.g., because of reciprocity of uplink and downlink channels, reduced power consumption associated with switching components associated with different antennas, or both). In cases where the second subset of antenna elements includes more physical antennas than the first subset of antenna elements, it may be advantageous to have N common antennas between uplink and downlink. For example, the first N antennas may be selected based on uplink metrics and the additional antennas of the second subset may be selected based on downlink metrics. In cases where the second subset of antenna elements includes a same number of physical antennas as the first subset of antenna elements, it may be advantageous to use the same antennas for uplink and downlink. For example, a same subset of antenna elements may be selected for both the first subset and the second subset, based on a combination of uplink and downlink metrics.

In some cases, antenna selection metrics may be different for uplink and downlink communications. For example, metrics for uplink communications may include power headroom (PHR) and reference signal received power (RSRP), which may be based on reference signals 215 (e.g., SSB, TRS, CSI-RS). In some cases, the first subset of antenna elements 235 may be identified based on which of the antenna elements 230 have a highest measured RSRP with positive PHR. In some cases, metrics for downlink communications may be used to select a favorable combination of antenna elements 235 (e.g., to reduce a number of active receiver antennas to save power). In some cases, downlink metrics may include a signal-to-noise ratio (SNR) and calculated MIMO capacity. For example, for K=4, M=2, selection may be performed according to:

$$\underset{\substack{i,j\in\{UL\,ant\}\\i\neq j}}{\operatorname{argmax}} \tilde{C}_{ij}$$

where, for each antenna pair i, j, a capacity estimate ($\tilde{C}_{i,j}$) is computed to identify an antenna pair of available antenna pairs that has a highest estimated capacity. The capacity estimate may be performed, in some examples, according to:

$$\tilde{C}_{ij}:=\log_2[(1+SNR_i)(1+SNR_j)-b_{corr}\rho_{ij}^2 SNR_i SNR_j],$$

where $b_{corr}$ is the confidence level for antenna correlation estimation, SNR is the SNR estimate per antenna (SNR$_i$ where i=0, 1, . . . , 3), and $\rho_{i,j}$ is a receiver correlation of each antenna pair, where i, j∈{0, 1, . . . , 3} and i≠j. In other examples, the calculated capacity may be estimated based on channel state feedback (CSF) and an estimated spectral efficiency of the channel associated with different combinations of antenna elements. In further examples, the calculated capacity may be estimated based on measurements of RSRP evaluated per antenna port (calculated according to SSB), where channels having low correlation may be estimated to have better capacity.

In the example, of FIG. 2, the number of antenna elements in the second subset of antenna elements 240 is greater than the number of antenna elements in the first subset of antenna elements 235. In some cases, uplink communications are prioritized (e.g., due to uplink transmissions consuming more power than downlink receptions), and the UE 115-*a* may constrain antenna selection for the second subset of antenna elements 240 to include the first subset of antenna elements 235. In such cases, N antennas may be selected for the first subset of antenna elements 235 (e.g., based on antenna elements 230 having highest measured RSRP), and the same antennas may be included in the second set of antenna elements 235. For the remaining receive antennas of the second subset of antenna elements 240, the antenna elements 230 may be selected to enhance or maximize estimated capacity given the constraint of the first subset of antenna elements 235 being included in the second subset of antenna elements 240. The second subset of antenna elements 240 may thus be selected based on the first subset of antenna elements 235 and one or more channel metrics. Thus, antenna switching related to uplink and downlink communications may be reduced, which may help to conserve power at the UE 115-*a*. In some cases, there may be advantages in using a same physical antenna for both uplink and downlink, because of reciprocity of uplink and downlink channels. This can result in improvement in both uplink and downlink performance, since uplink and downlink channels at a particular antenna are the same, and channel state feedback captures both of them.

In other cases, the number of antenna elements in the second subset of antenna elements 240 may be equal to the number of antenna elements in the first subset of antenna elements 235, and in such cases joint antenna selection may be used to select antenna elements 230 that are suitable for uplink and downlink communications. In some cases, the UE 115-*a* may separately identify the first subset of antenna elements and the second subset of antenna elements. If the same antenna elements 230 are identified for both the uplink and downlink communications, this subset of antenna elements may be configured for both uplink and downlink communications.

In other cases, different subsets of antenna elements may be identified for uplink and downlink communications. In such cases, the UE 115-*a* may select one of the first subset of antenna elements or the second subset of antenna elements for communications. Such a selection may be based on, for example, a comparison of uplink and downlink metrics for each subset (e.g., a difference in capacity estimates between antenna elements 230 identified for the first subset of antenna elements and the second subset of antenna elements, and a difference in RSRP values between the subsets). In some examples, a scaling factor (e.g., α) may be defined to scale uplink or downlink communications based on one or more factors, such as RSRP, an amount of uplink data to be transmitted (e.g., an uplink buffer value), an amount of downlink data to be received (e.g., a downlink buffer value), a priority associated with uplink or downlink communications, or any combinations thereof (e.g. α=f (RSRP, $UL_{Buffer}$, $DL_{Buffer}$)). If the downlink metric is greater than the scaled uplink metric (or the scaled downlink metric is greater than the uplink metric), the second subset of antenna elements may be selected, and otherwise the first subset of antenna elements may be selected. In some cases, the scaling factor may range from less than one (e.g., 0 or 0.25, to favor antenna selection based on downlink when the scaling factor is applied to an uplink metric) to greater than one (e.g., 10, 100, 1000, to favor antenna selection based on uplink when the scaling factor is applied to an uplink metric), based on a preference to be given to downlink or uplink communications. In some cases, a threshold value may be used to select which subset of antenna elements is to be used, where the threshold value is associated with a difference between uplink and downlink metrics (e.g., a difference in an amount of downlink and uplink traffic, or a difference in one or more of the uplink or downlink channel metrics). In some examples, the subset of antennas may be selected based on uplink channel metrics or downlink channel metrics, and a comparison of one or more linear combinations of uplink channel metrics and downlink channel metrics with a threshold. Such techniques may provide for a reduced number of antennas and associated components (e.g., antennas and components illustrated in FIG. 3) that are to be switched between uplink and downlink communications.

Figure 3:
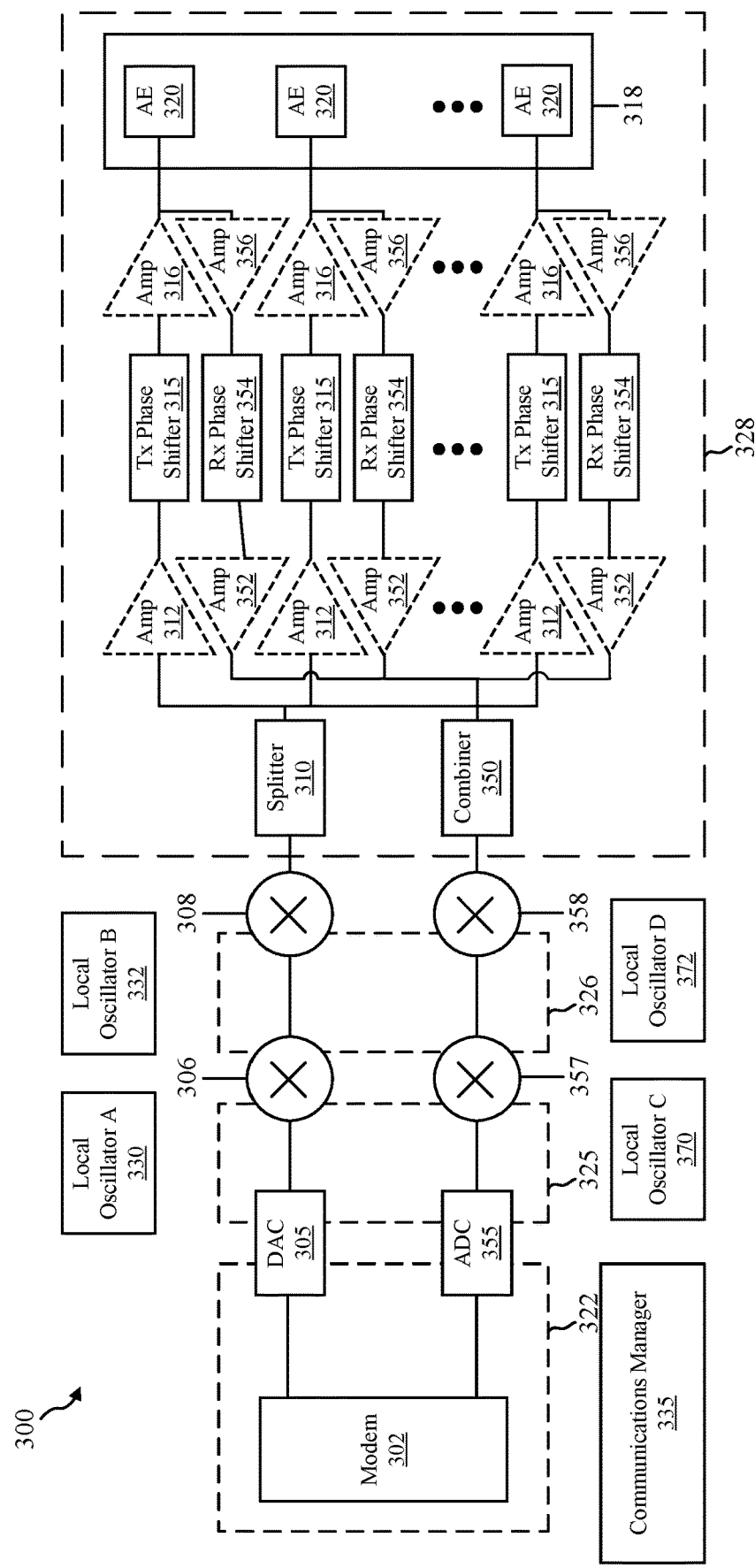
FIG. 3 illustrates an example of an antenna module that supports antenna selection techniques for uplink and downlink wireless communications in accordance with aspects of the present disclosure.

FIG. 3 illustrates an example of an antenna module 300 that supports antenna selection techniques for uplink and downlink wireless communications in accordance with aspects of the present disclosure. In some examples, antenna module 300 may implement aspects of wireless communications systems 100 or 200, as described with reference to FIGS. 1 and 2. In some examples, antenna module 300 may be an example of an antenna system 225 and include antenna elements 230 of FIG. 2. In some examples, antenna module 300 may be incorporated in a transmitting device or a receiving device (e.g., a UE or a base station), as described herein.

Broadly, FIG. 3 is a diagram illustrating example hardware components of a wireless device in accordance with certain aspects of the disclosure. The illustrated components may include those that may be used for antenna element selection where each antenna element has an associated number of components that may be switched on and off based on uplink and downlink communications. Further, some components illustrated in FIG. 3 (e.g., modem, communications manager, oscillators, etc.) may be shared with one or more other antenna modules that may be included in a transmitting device or a receiving device. It is noted that there are numerous architectures for antenna elements and associated components, only one example of which is illustrated here. The antenna module 300 includes a modem (modulator/demodulator) 302, a digital to analog converter (DAC) 305, a first mixer 306, a second mixer 308, and a splitter 310. The antenna module 300 also includes a plurality of first amplifiers 312, a plurality of phase shifters 315, a plurality of second amplifiers 316, and an antenna array 318 that includes a plurality of antenna elements 320. Transmission lines or other waveguides, wires, traces, or the like are shown connecting the various components to illustrate how signals to be transmitted may travel between components. Boxes 322, 325, 326, and 328 indicate regions in the antenna module 300 in which different types of signals travel or are processed. Specifically, box 322 indicates a region in which digital baseband signals travel or are processed, box 325 indicates a region in which analog baseband signals travel or are processed, box 326 indicates a region in which analog intermediate frequency (IF) signals travel or are processed, and box 328 indicates a region in which analog radio frequency (RF) signals travel or are processed. The architecture also includes a local oscillator A 330, a local oscillator B 332, and a communications manager 335.

Each of the antenna elements 320 may include one or more sub-elements (not shown) for radiating or receiving RF signals. For example, a single antenna element 320 may include a first sub-element cross-polarized with a second sub-element that can be used to independently transmit cross-polarized signals (e.g., in different ranks or layers). The antenna elements 320 may include patch antennas or other types of antennas arranged in a linear, two dimensional, or other pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control selection of antenna elements 320 for uplink and downlink communications. In some cases, antenna elements 320 used for uplink may include a subset of available antenna elements (e.g., may be a first subset of antenna elements) that are selected in accordance with techniques discussed herein. In some cases, the modem 302 may control operation of the DAC 305, first and second mixers 306, 308, splitter 310, first amplifiers 312, phase shifters 315, and/or the second amplifiers 316 to transmit signals via the selected subset of antenna elements 320 (e.g., one or more or all of the antenna elements 320). The modem 302 may process signals and control operation in accordance with a communication standard such as a wireless standard discussed herein. The modem 302 or communications manager 335 (or communications manager 335 that is included in the modem 302) may also control selection of antenna elements for uplink and downlink communications in accordance with techniques as discussed herein.

The DAC 305 may convert digital baseband signals received from the modem 302 (and that are to be transmitted) into analog baseband signals. The first mixer 306 upconverts analog baseband signals to analog IF signals within an IF using a local oscillator A 330. The second mixer 308 upconverts the analog IF signals to analog RF signals using the local oscillator B 332. Similarly to the first mixer, the second mixer 308 may mix the signals with an oscillating signal generated by the local oscillator B 332 to "move" the IF analog signals to the RF, or the frequency at which signals will be transmitted or received. The modem 302 and/or the communications manager 335 may adjust the frequency of local oscillator A 330 and/or the local oscillator B 332 so that a desired IF and/or RF frequency is produced and used to facilitate processing and transmission of a signal within a desired bandwidth.

In the illustrated antenna module 300, signals upconverted by the second mixer 308 are split or duplicated into multiple signals by the splitter 310 based on which antenna elements 320 are activated. The splitter 310 in antenna module 300 splits the RF signal into a plurality of identical or nearly identical RF signals, as denoted by its presence in box 328. In other examples, the split may take place with any type of signal including with baseband digital, baseband analog, or IF analog signals. Each of these signals may correspond to an antenna element 320 and the signal travels through and is processed by amplifiers 312, 316, phase shifters 315, and/or other elements corresponding to the respective antenna element 320 to be provided to and transmitted by the corresponding antenna element 320 of the antenna array 318. After being split by the splitter 310, the resulting RF signals may enter an amplifier, such as a first amplifier 312, or a phase shifter 315 corresponding to an antenna element 320. The first and second amplifiers 312, 316 are illustrated with dashed lines because one or both of them might not be necessary in some implementations. The amplifiers 312, 316 may provide a desired level of positive or negative gain. Each of the amplifiers 312, 316 may be controlled independently (e.g., by the modem 302 or communications manager 335) to provide independent control of the gain for each antenna element 320. For example, the modem 302 and/or the communications manager 335 may have at least one control line connected to each of the splitter 310, first amplifiers 312, phase shifters 315, and/or second amplifiers 316 which may be used to configure a gain to provide a desired amount of gain for each component and thus each antenna element 320. The phase shifter 315 may provide a configurable phase shift or phase offset to a corresponding RF signal to be transmitted. The modem 302 and/or the communications manager 335 may have at least one control line connected to each of the phase shifters 315 and which may be used to configure the phase shifters 315 to provide a desired amounts of phase shift or phase offset between antenna elements 320.

In the illustrated antenna module 300, RF signals received by the antenna elements 320 are provided to one or more of first amplifier 356 to boost the signal strength. In some cases, antenna elements 320 used for downlink may include a subset of available antenna elements (e.g., may be a second subset of antenna elements) that are selected in accordance with techniques discussed herein. The boosted RF signal is input into one or more of phase shifter 354 to provide a configurable phase shift or phase offset for the corresponding received RF signal. The modem 302 and/or the communications manager 335 may have at least one control line connected to each of the phase shifters 354 and which may be used to configure the phase shifters 354 to provide a desired amount of phase shift or phase offset between antenna elements 320. The outputs of the phase shifters 354 may be input to one or more second amplifiers 352 for signal amplification of the phase shifted received RF signals. The second amplifiers 352 may be individually configured to provide an amount of gain to ensure that the signal input to combiner 350 have the same magnitude. The amplifiers 352 and/or 356 are illustrated in dashed lines because they might not be necessary in some implementations.

The combiner 350 in this exemplary architecture combines the RF signal into a signal, as denoted by its presence in box 328. The output of the combiner 350 is input into mixers 358 and 357. Mixers 358 and 357 generally down convert the received RF signal using inputs from local oscillators 372 and 370, respectively, to create intermediate or baseband signals that carry the encoded and modulated information. The output of the mixers 358 and 357 are input into an analog-to-digital converter (ADC) 355 for conversion to analog signals. The analog signals output from ADC 355 is input to modem 302 for baseband processing, e.g., decoding, de-interleaving, etc.

The antenna module 300 is given by way of example only to illustrate an architecture for transmitting and/or receiving signals in which antenna elements 320 may be selected as discussed herein. It will be understood that the antenna module 300 and/or each portion of the antenna module 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included each with one or more of their own corresponding amplifiers, phase shifters, splitters, mixers, DACs, ADCs, and/or modems. For example, a single UE may include two, four or more antenna panels or virtual antenna panels for transmitting or receiving signals at different physical locations on the UE or in different directions. Furthermore, mixers, splitters, amplifiers, phase shifters and other components may be located in different signal type areas (e.g., different ones of the boxes 322, 325, 326, 328) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 310, amplifiers 312, 316, or phase shifters 315 may be located between the DAC 305 and the first mixer 306 or between the first mixer 306 and the second mixer 308. In one example, the functions of one or more of the components may be combined into one component. For example, the phase shifters 315 may perform amplification to include or replace the first and/or or second amplifiers 312, 316. By way of another example, a phase shift may be implemented by the second mixer 308 to obviate the need for a separate phase shifter 315. This technique is sometimes called local oscillator (LO) phase shifting. In one implementation of this configuration, there may be a plurality of IF to RF mixers (e.g., for each antenna element chain) within the second mixer 308 and the local oscillator B 332 would supply different local oscillator signals (with different phase offsets) to each IF to RF mixer.

The modem 302 and/or the communications manager 335 may control one or more of the other components 305-572 to select one or more antenna elements 320 for uplink and downlink communications. For example, the antenna elements 320 may be individually selected or deselected for transmission of a signal (or signals) by controlling whether associated components are enabled.

Figure 4:
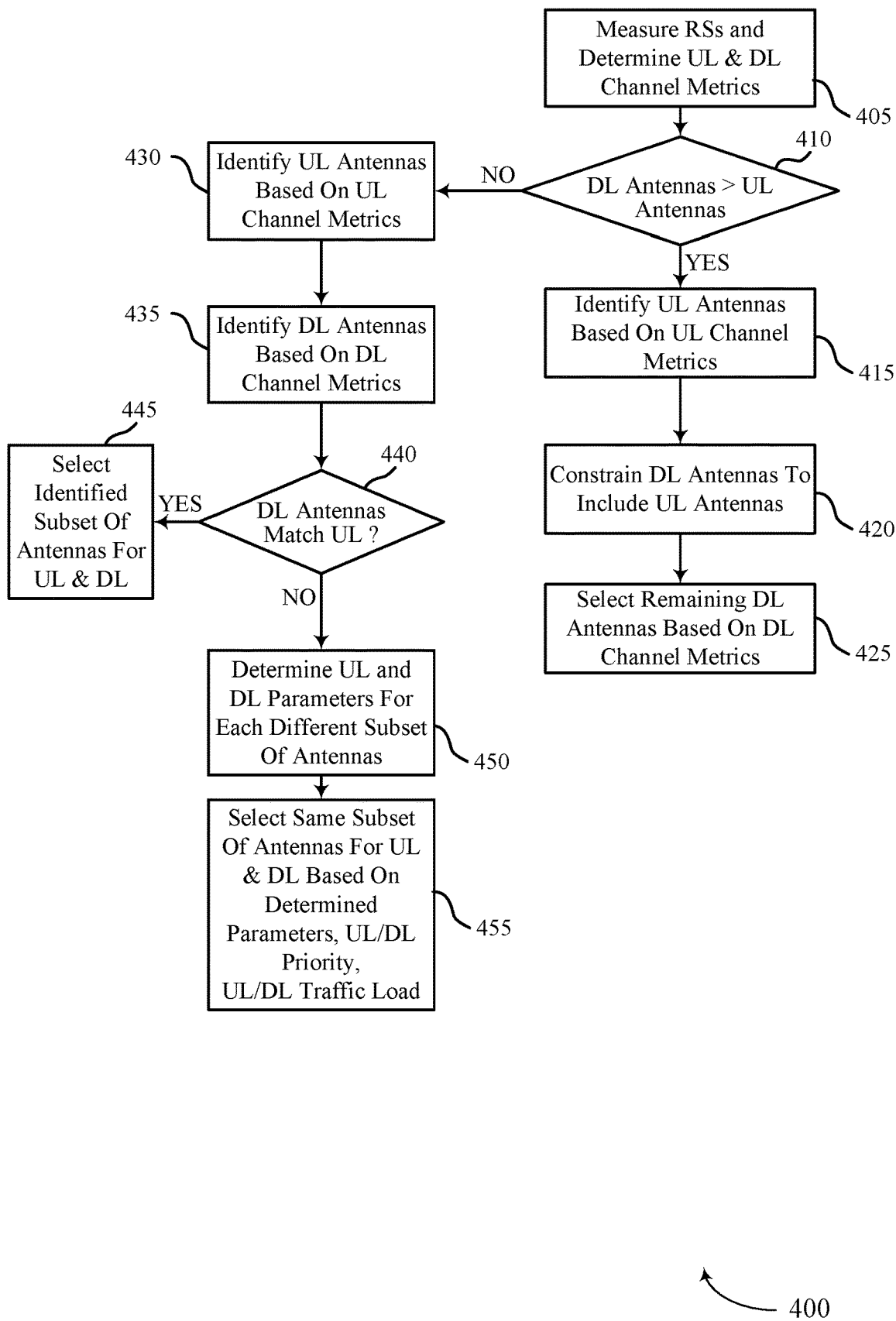
FIG. 4 illustrates an example of a method that supports antenna selection techniques for uplink and downlink wireless communications in accordance with aspects of the present disclosure.

FIG. 4 illustrates an example of a method 400 that supports antenna selection techniques for uplink and downlink wireless communications in accordance with aspects of the present disclosure. The operations of the method 400 may be implemented by a UE or its components as described herein. For example, the operations of the method 400 may be performed by a UE 115 as described with reference to FIGS. 1 and 2, or may be performed by a modem 302 and/or communications manager 335 of FIG. 3. In some examples, a UE or associated components may execute a set of instructions to control the functional elements of the UE to perform the described functions. Additionally or alternatively, the UE may perform aspects of the described functions using special-purpose hardware. Operations shown and discussed in the example of FIG. 4 may be performed in a different order than the example order shown, or the operations performed may be performed in different orders or at different times. Some operations may be combined or omitted and other operations may be added to the method 400.

In this example, at 405, the UE may measure one or more reference signals (e.g., a CSI-RS, SSB, TRS, DMRS, or other reference signal that may be transmitted by the base station) and determine one or more uplink and downlink channel metrics. For example, the UE may measure a parameter (e.g., a RSRP, SINR, SNR, etc.) of a reference signal using separate individual antenna elements and/or combinations of antenna elements, and determine one or more channel metrics (e.g., an estimated capacity for downlink communications based on SINR or SNR, and a RSRP for uplink communications).

At 410, the UE may determine if a number of antennas to be used for downlink communications is greater than a number of antennas to be used for uplink communications. In some cases, such a determination may be made based on a rank that is configured for uplink and downlink communications, one or more MIMO parameters, uplink and downlink traffic, or one or more other subsystems that determine the number of uplink and downlink antennas. At 415, if the number of downlink antennas is greater than the number of uplink antennas, the UE may identify uplink antennas of a first subset of antenna elements based on one or more uplink channel metrics (e.g., RSRP, SNR, SINR, or any combinations thereof). At 420, the UE may constrain the downlink antennas to include the identified uplink antennas. At 425, the UE may then select the remaining downlink antennas based on one or more downlink channel metrics (e.g., RSRP, SNR, SINR, estimated capacity, estimated spectral efficiency, or any combinations thereof).

At 430, if it is determined that the number of downlink antennas is not greater than the number of uplink antennas, the UE may identify preferred uplink antennas from the set of available antenna elements based on one or more uplink channel metrics (e.g., RSRP, SNR, SINR, or any combinations thereof). At 435, the UE may identify preferred downlink antennas from the set of available antenna elements based on one or more downlink channel metrics (e.g., RSRP, SNR, SINR, estimated capacity, estimated spectral efficiency, or any combinations thereof).

At 440, the UE may determine if the identified uplink antennas match the identified downlink antennas. At 445, if it is determined that the same preferred antennas are identified for both uplink and downlink, the UE may select the identified antennas as both the first subset of antennas for uplink communications and the second subset of antennas for downlink communications. At 450, if it is determined that the identified preferred downlink and uplink antennas do not match, the UE may determine uplink and downlink parameters for each different subset of antenna elements (e.g., estimated capacity or spectral efficiency for downlink for each different subset, and RSRP for uplink for each different subset). At 455, the UE may select one of the identified subsets as both the first subset of antennas for uplink communications and the second subset of antennas for downlink communications, based on the determined parameters, uplink or downlink priority, uplink or downlink traffic load, or any combinations thereof. In some cases, the selection of the subset of antenna elements may be based on a scaling factor that is applied to the uplink or downlink metrics, and where the scaling factor is based on uplink or downlink priority, uplink or downlink traffic load, RSRP values, or any combinations thereof. Such techniques may provide for a reduced number of antennas and associated components (e.g., antennas and components illustrated in FIG. 3) that are to be switched between uplink and downlink communications.

Figure 5:
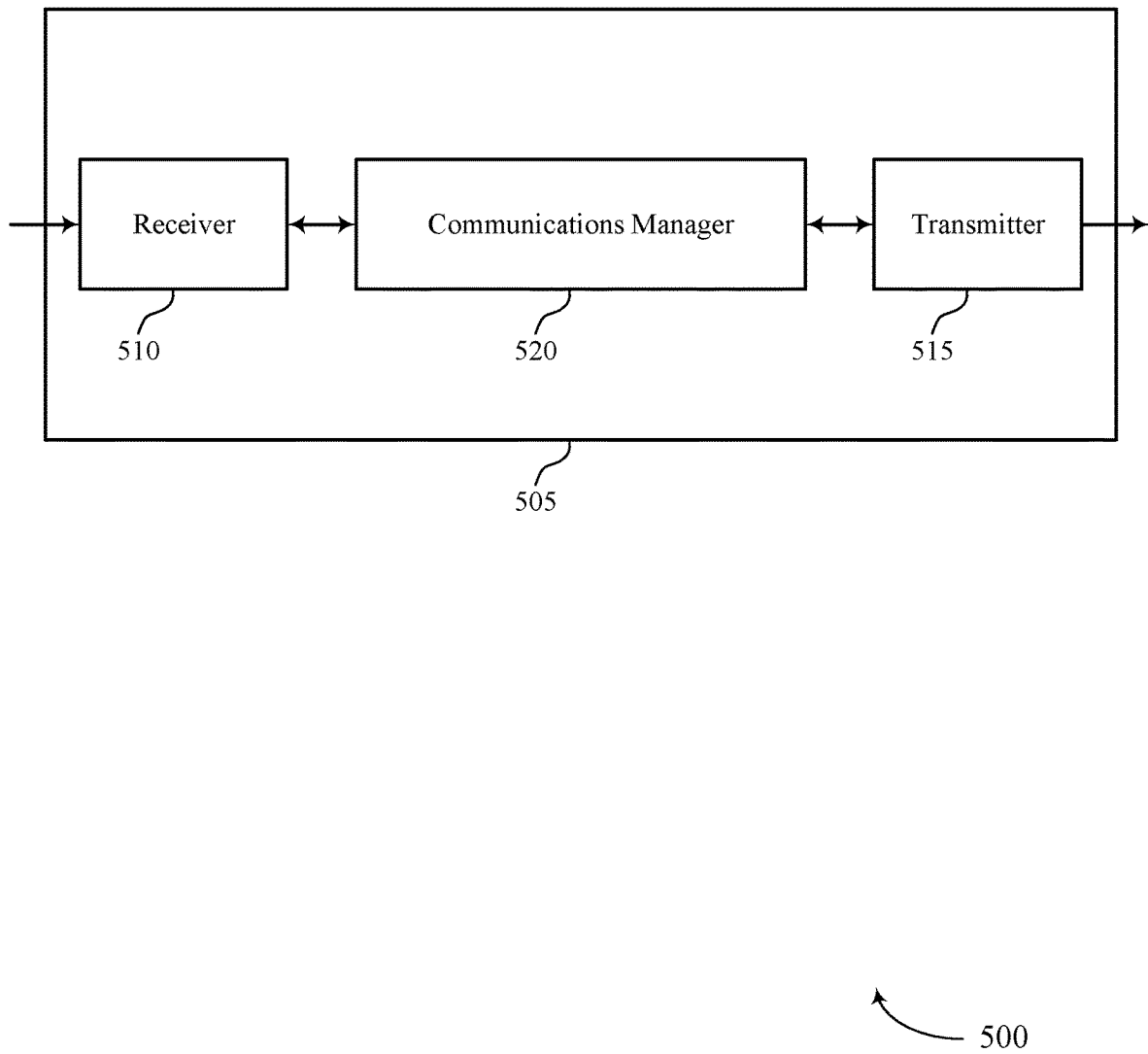
FIGS. 5 and 6 show block diagrams of devices that support antenna selection techniques for uplink and downlink wireless communications in accordance with aspects of the present disclosure.

FIG. 5 shows a block diagram 500 of a device 505 that supports antenna selection techniques for uplink and downlink wireless communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to antenna selection techniques for uplink and downlink wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to antenna selection techniques for uplink and downlink wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of antenna selection techniques for uplink and downlink wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for identifying one or more uplink channel metrics associated with an uplink channel between the UE and an access network entity. The communications manager 520 may be configured as or otherwise support a means for measuring one or more downlink channel metrics associated with a downlink channel between the UE and the access network entity. The communications manager 520 may be configured as or otherwise support a means for identifying an amount of downlink traffic and an amount of uplink traffic for communications between the UE and the access network entity. The communications manager 520 may be configured as or otherwise support a means for configuring, from a set of available antennas, a first subset of antennas for transmitting uplink communications to the access network entity based on the one or more uplink channel metrics. The communications manager 520 may be configured as or otherwise support a means for configuring, from the set of available antennas, a second subset of antennas for receiving downlink communications from the access network entity based on the first subset of antennas, the one or more downlink channel metrics, the amount of downlink traffic, and the amount of uplink traffic. The communications manager 520 may be configured as or otherwise support a means for communicating with the access network entity using the first subset of antennas for uplink transmissions and the second subset of antennas for downlink transmissions.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for efficient antenna management at a wireless device. For example, implementation of antenna selection techniques at a UE may mitigate frequent antenna and receive chain switching that may occur when different subsets of antennas are used for uplink and downlink communications. Such techniques may thus enhance UE efficiency and reduce power consumption, which may help to increase battery life. Further, there may be advantages in using a same physical antenna for both uplink and downlink, because of reciprocity of uplink and downlink channels. This can result in improvement in both uplink and downlink performance, since uplink and downlink channels at a particular antenna are the same, and channel state feedback captures both of them.

Figure 6:
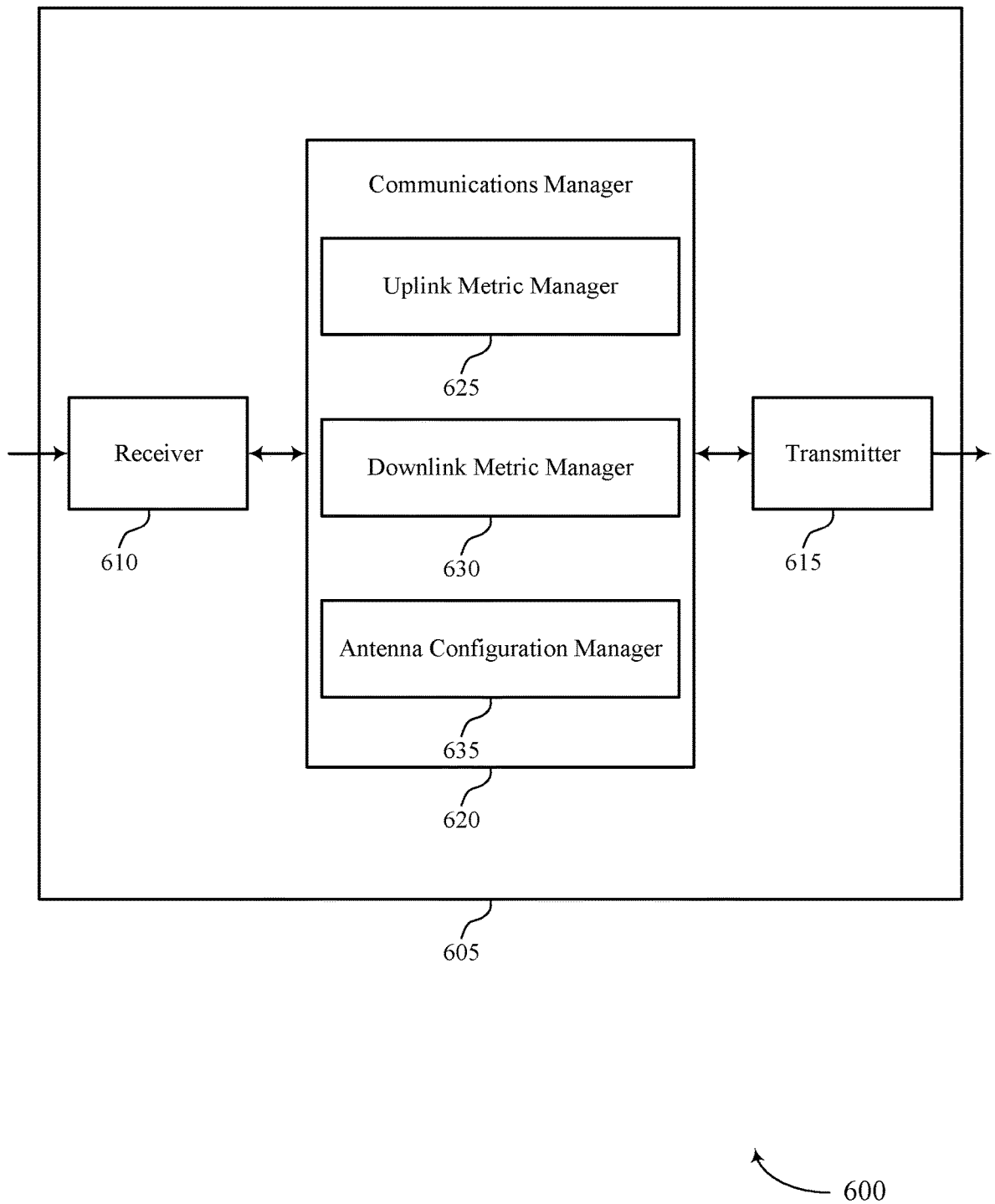

FIG. 6 shows a block diagram 600 of a device 605 that supports antenna selection techniques for uplink and downlink wireless communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to antenna selection techniques for uplink and downlink wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to antenna selection techniques for uplink and downlink wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of antenna selection techniques for uplink and downlink wireless communications as described herein. For example, the communications manager 620 may include an uplink metric manager 625, a downlink metric manager 630, an antenna configuration manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The uplink metric manager 625 may be configured as or otherwise support a means for identifying one or more uplink channel metrics associated with an uplink channel between the UE and an access network entity. The downlink metric manager 630 may be configured as or otherwise support a means for measuring one or more downlink channel metrics associated with a downlink channel between the UE and the access network entity. The downlink metric manager 630 may be configured as or otherwise support a means for identifying an amount of downlink traffic and an amount of uplink traffic for communications between the UE and the access network entity. The antenna configuration manager 635 may be configured as or otherwise support a means for configuring, from a set of available antennas, a first subset of antennas for transmitting uplink communications to the access network entity based on the one or more uplink channel metrics. The antenna configuration manager 635 may be configured as or otherwise support a means for configuring, from the set of available antennas, a second subset of antennas for receiving downlink communications from the access network entity based on the first subset of antennas, the one or more downlink channel metrics, the amount of downlink traffic, and the amount of uplink traffic. The antenna configuration manager 635 may be configured as or otherwise support a means for communicating with the access network entity using the first subset of antennas for uplink transmissions and the second subset of antennas for downlink transmissions.

Figure 7:
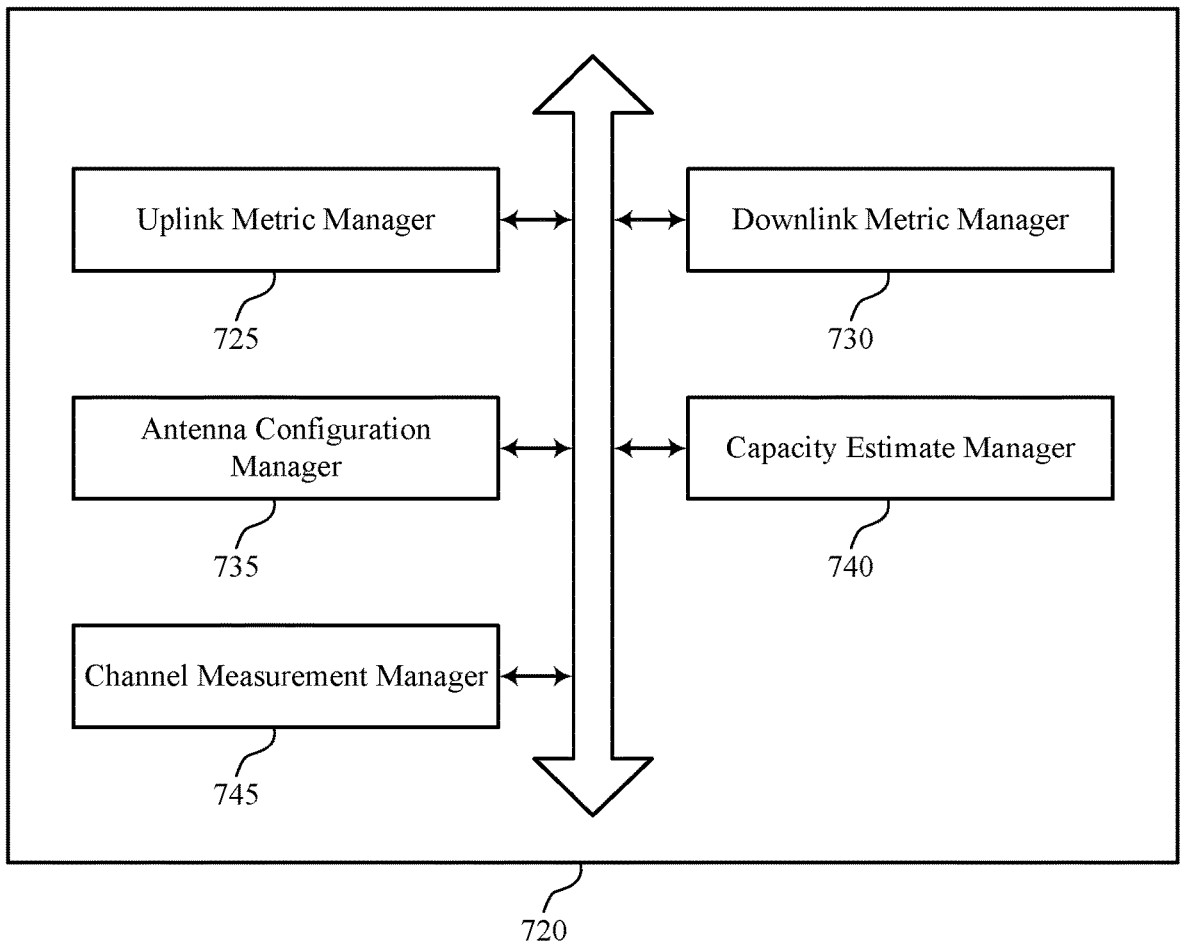
FIG. 7 shows a block diagram of a communications manager that supports antenna selection techniques for uplink and downlink wireless communications in accordance with aspects of the present disclosure.

FIG. 7 shows a block diagram 700 of a communications manager 720 that supports antenna selection techniques for uplink and downlink wireless communications in accordance with aspects of the present disclosure. The communications manager 720 may be an example of aspects of a communications manager 520, a communications manager 620, or both, as described herein. The communications manager 720, or various components thereof, may be an example of means for performing various aspects of antenna selection techniques for uplink and downlink wireless communications as described herein. For example, the communications manager 720 may include an uplink metric manager 725, a downlink metric manager 730, an antenna configuration manager 735, a capacity estimate manager 740, a channel measurement manager 745, or any combination thereof. Each of these components may communicate, directly or indirectly, with one another (e.g., via one or more buses).

The communications manager 720 may support wireless communication at a UE in accordance with examples as disclosed herein. The uplink metric manager 725 may be configured as or otherwise support a means for identifying one or more uplink channel metrics associated with an uplink channel between the UE and a access network entity. The downlink metric manager 730 may be configured as or otherwise support a means for measuring one or more downlink channel metrics associated with a downlink channel between the UE and the access network entity. In some examples, the downlink metric manager 730 may be configured as or otherwise support a means for identifying an amount of downlink traffic and an amount of uplink traffic for communications between the UE and the access network entity. The antenna configuration manager 735 may be configured as or otherwise support a means for configuring, from a set of available antennas, a first subset of antennas for transmitting uplink communications to the access network entity based on the one or more uplink channel metrics. In some examples, the antenna configuration manager 735 may be configured as or otherwise support a means for configuring, from the set of available antennas, a second subset of antennas for receiving downlink communications from the access network entity based on the first subset of antennas, the one or more downlink channel metrics, the amount of downlink traffic, and the amount of uplink traffic. In some examples, the antenna configuration manager 735 may be configured as or otherwise support a means for communicating with the access network entity using the first subset of antennas for uplink transmissions and the second subset of antennas for downlink transmissions.

In some examples, the one or more uplink channel metrics are identified based on a RSRP of one or more reference signals from the access network entity that is measured for each antenna of the set of available antennas. In some examples, the RSRP is measured from one or more of a SSB, a TRS, a CSI-RS, or any combinations thereof. In some examples, the one or more downlink channel metrics include a channel capacity estimate associated with each antenna of the set of available antennas. In some examples, the channel capacity estimate is based on a spectral efficiency measurement, a signal to noise measurement, or a RSRP measurement associated with each antenna of the set of available antennas, or combinations of antenna elements.

In some examples, the second subset of antennas includes more antennas than the first subset of antennas, and where each of the antenna of the first subset of antennas is included in the second subset of antennas. In some examples, the first subset of antennas are configured to include antennas of the set of available antennas that have more favorable uplink channel metrics, and one or more remaining antennas of the set of available antennas are configured for inclusion in the second subset of antennas based on respective downlink channel metrics. In some examples, the one or more remaining antennas include a first antenna that is selected for inclusion in the second subset of antennas based on one or more combined metrics of the first antenna and one or more antennas of the first subset of antennas.

In some examples, the first subset of antennas includes a same number of antennas as the second subset of antennas, and where a same subset of antennas of the set of available antennas are configured for both the first subset of antennas and the second subset of antennas. In some examples, the antennas of the same subset of antennas are configured based on a threshold value that is associated with a difference between the amount of downlink traffic and the amount of uplink traffic, and one or more of the uplink channel metrics, the downlink channel metrics, or a priority associated with the uplink communications and the downlink communications.

In some examples, the priority associated with the uplink communications and the downlink communications is selected based on a reference signal received power (RSRP) that is measured for one or more antennas of the set of available antennas. In some examples, the antennas of the same subset of antennas are configured based on uplink channel metrics or downlink channel metrics, and a comparison of one or more linear combinations of uplink channel metrics and downlink channel metrics with a threshold.

Figure 8:
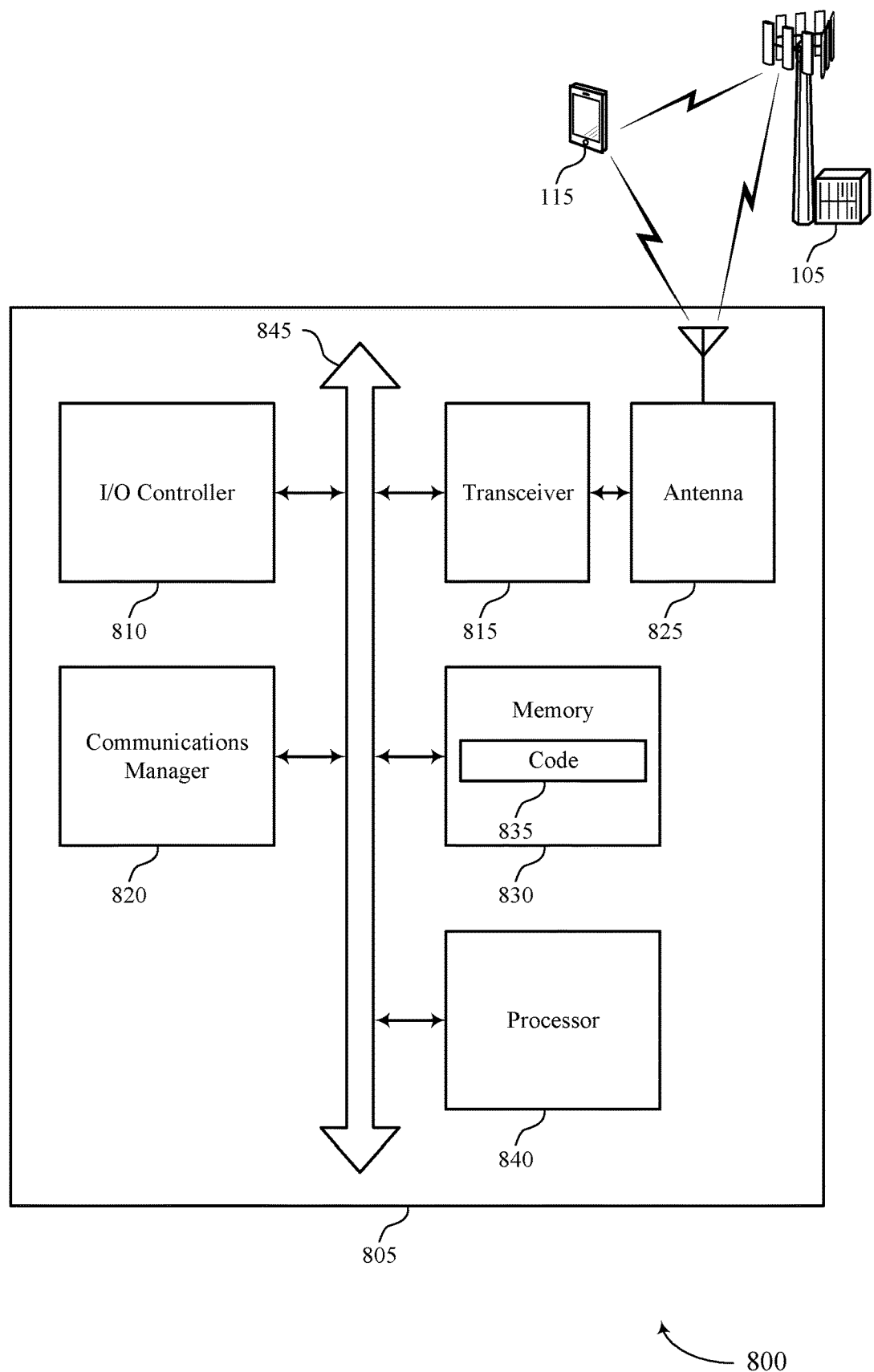
FIG. 8 shows a diagram of a system including a device that supports antenna selection techniques for uplink and downlink wireless communications in accordance with aspects of the present disclosure.

FIG. 8 shows a diagram of a system 800 including a device 805 that supports antenna selection techniques for uplink and downlink wireless communications in accordance with aspects of the present disclosure. The device 805 may be an example of or include the components of a device 505, a device 605, or a UE 115 as described herein. The device 805 may communicate wirelessly with one or more base stations 105, access network entities 140, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting antenna selection techniques for uplink and downlink wireless communications). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for identifying one or more uplink channel metrics associated with an uplink channel between the UE and an access network entity. The communications manager 820 may be configured as or otherwise support a means for measuring one or more downlink channel metrics associated with a downlink channel between the UE and the access network entity. The communications manager 820 may be configured as or otherwise support a means for identifying an amount of downlink traffic and an amount of uplink traffic for communications between the UE and the access network entity. The communications manager 820 may be configured as or otherwise support a means for configuring, from a set of available antennas, a first subset of antennas for transmitting uplink communications to the access network entity based on the one or more uplink channel metrics. The communications manager 820 may be configured as or otherwise support a means for configuring, from the set of available antennas, a second subset of antennas for receiving downlink communications from the access network entity based on the first subset of antennas, the one or more downlink channel metrics, the amount of downlink traffic, and the amount of uplink traffic. The communications manager 820 may be configured as or otherwise support a means for communicating with the access network entity using the first subset of antennas for uplink transmissions and the second subset of antennas for downlink transmissions.

By including or configuring the communications manager 820 in accordance with examples as described herein, the device 805 may support techniques for efficient antenna management at a wireless device. For example, implementation of antenna selection techniques at a UE may mitigate frequent antenna and receive chain switching that may occur when different subsets of antennas are used for uplink and downlink communications. Such techniques may thus enhance UE efficiency and reduce power consumption, which may help to increase battery life. Further, there may be advantages in using a same physical antenna for both uplink and downlink, because of reciprocity of uplink and downlink channels. This can result in improvement in both uplink and downlink performance, since uplink and downlink channels at a particular antenna are the same, and channel state feedback captures both of them.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of antenna selection techniques for uplink and downlink wireless communications as described herein, or the processor 840 and the memory 830 may be otherwise configured to perform or support such operations.

Figure 9:
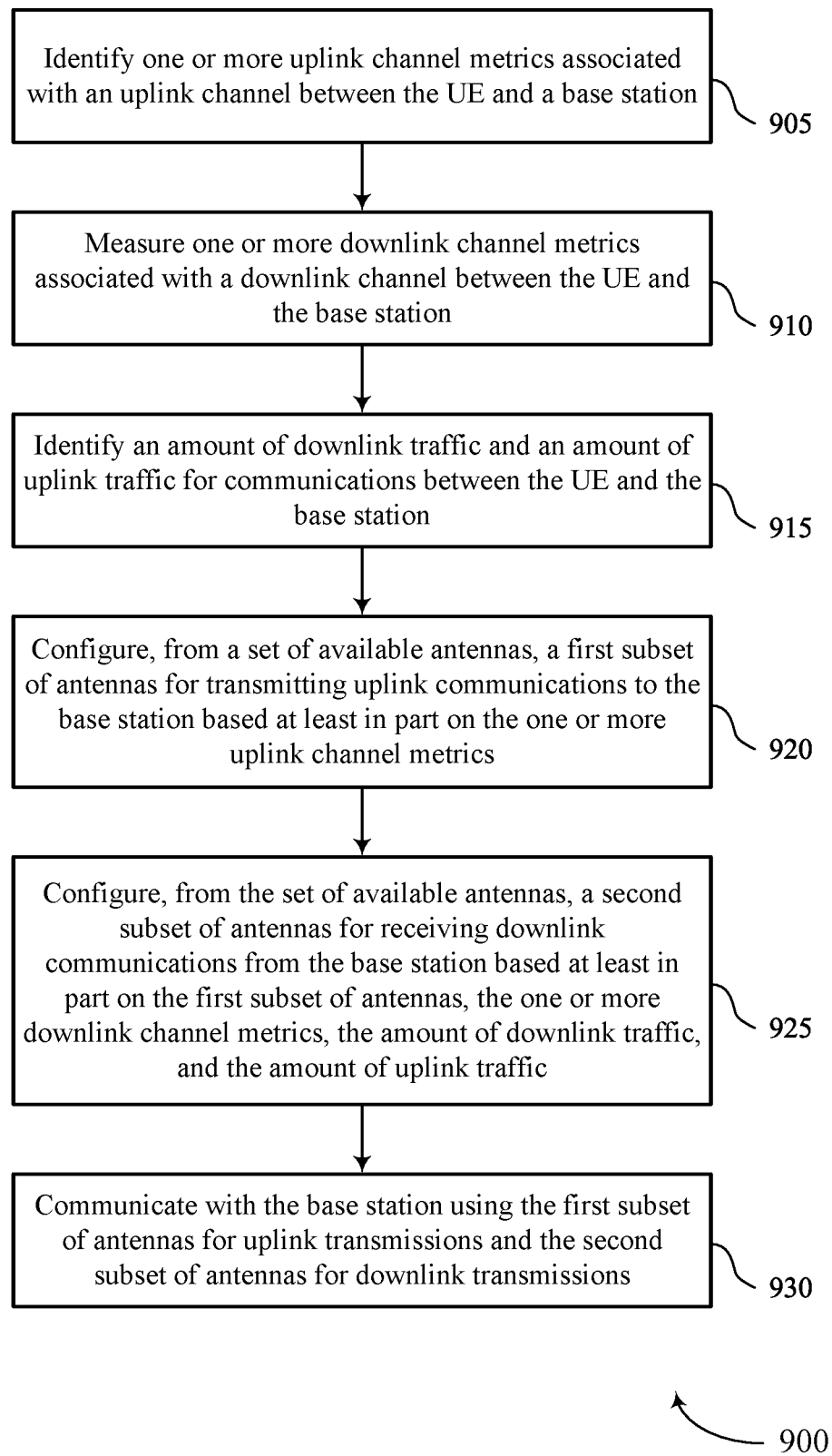
FIGS. 9 and 10 show flowcharts illustrating methods that support antenna selection techniques for uplink and downlink wireless communications in accordance with aspects of the present disclosure.

FIG. 9 shows a flowchart illustrating a method 900 that supports antenna selection techniques for uplink and downlink wireless communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include identifying one or more uplink channel metrics associated with an uplink channel between the UE and an access network entity. The operations of 905 may be performed in accordance with examples as disclosed herein. In some examples, aspects of the operations of 905 may be performed by an uplink metric manager 725 as described with reference to FIG. 7.

At 910, the method may include measuring one or more downlink channel metrics associated with a downlink channel between the UE and the access network entity. The operations of 910 may be performed in accordance with examples as disclosed herein. In some examples, aspects of the operations of 910 may be performed by a downlink metric manager 730 as described with reference to FIG. 7.

At 915, the method may include identifying an amount of downlink traffic and an amount of uplink traffic for communications between the UE and the access network entity. The operations of 915 may be performed in accordance with examples as disclosed herein. In some examples, aspects of the operations of 915 may be performed by a downlink metric manager 730 as described with reference to FIG. 7.

At 920, the method may include configuring, from a set of available antennas, a first subset of antennas for transmitting uplink communications to the access network entity based on the one or more uplink channel metrics. The operations of 920 may be performed in accordance with examples as disclosed herein. In some examples, aspects of the operations of 920 may be performed by an antenna configuration manager 735 as described with reference to FIG. 7.

At 925, the method may include configuring, from the set of available antennas, a second subset of antennas for receiving downlink communications from the access network entity based on the first subset of antennas, the one or more downlink channel metrics, the amount of downlink traffic, and the amount of uplink traffic. The operations of 925 may be performed in accordance with examples as disclosed herein. In some examples, aspects of the operations of 925 may be performed by an antenna configuration manager 735 as described with reference to FIG. 7.

At 930, the method may include communicating with the access network entity using the first subset of antennas for uplink transmissions and the second subset of antennas for downlink transmissions. The operations of 930 may be performed in accordance with examples as disclosed herein. In some examples, aspects of the operations of 930 may be performed by an antenna configuration manager 735 as described with reference to FIG. 7.

Figure 10:
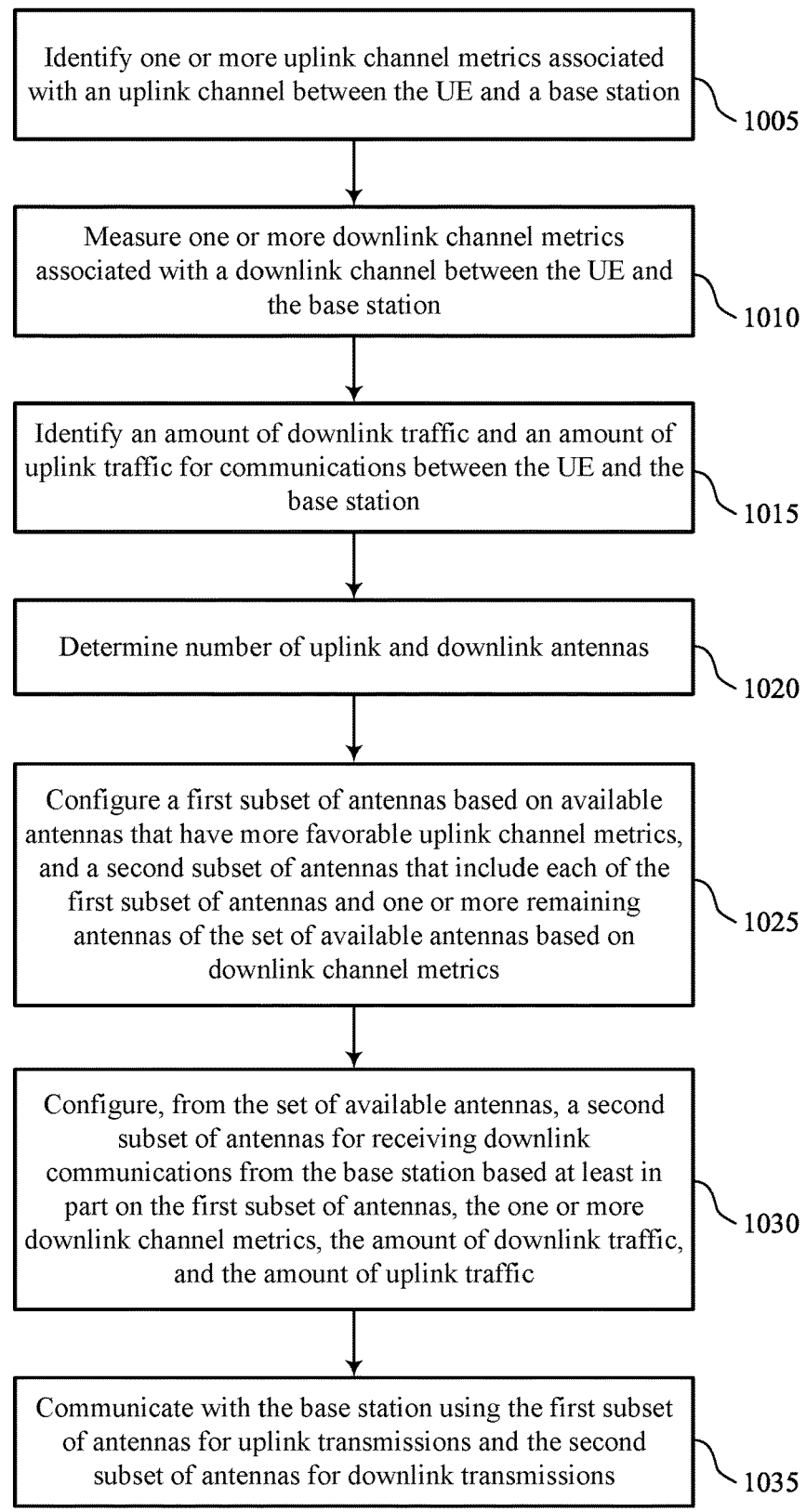

FIG. 10 shows a flowchart illustrating a method 1000 that supports antenna selection techniques for uplink and downlink wireless communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include identifying one or more uplink channel metrics associated with an uplink channel between the UE and an access network entity. The operations of 1005 may be performed in accordance with examples as disclosed herein. In some examples, aspects of the operations of 1005 may be performed by an uplink metric manager 725 as described with reference to FIG. 7.

At 1010, the method may include measuring one or more downlink channel metrics associated with a downlink channel between the UE and the access network entity. The operations of 1010 may be performed in accordance with examples as disclosed herein. In some examples, aspects of the operations of 1010 may be performed by a downlink metric manager 730 as described with reference to FIG. 7.

At 1015, the method may include identifying an amount of downlink traffic and an amount of uplink traffic for communications between the UE and the access network entity. The operations of 1015 may be performed in accordance with examples as disclosed herein. In some examples, aspects of the operations of 1015 may be performed by a downlink metric manager 730 as described with reference to FIG. 7.

At 1020, the method may include determining a number of uplink and downlink antennas. The operations of 1020 may be performed in accordance with examples as disclosed herein. In some examples, aspects of the operations of 1020 may be performed by an antenna configuration manager 735 as described with reference to FIG. 7.

At 1025, the method may include configuring a first subset of antennas based on available antennas that have more favorable uplink channel metrics, and a second subset of antennas that include each of the first subset of antennas and one or more remaining antennas of the set of available antennas based on downlink channel metrics. The operations of 1025 may be performed in accordance with examples as disclosed herein. In some examples, aspects of the operations of 1025 may be performed by an antenna configuration manager 735 as described with reference to FIG. 7.

At 1030, the method may include communicating with the access network entity using the first subset of antennas for uplink transmissions and the second subset of antennas for downlink transmissions. The operations of 1030 may be performed in accordance with examples as disclosed herein. In some examples, aspects of the operations of 1030 may be performed by an antenna configuration manager 735 as described with reference to FIG. 7.

The following provides an overview of aspects of the present disclosure:

Aspect 1: A method for wireless communication at a UE, comprising: identifying one or more uplink channel metrics associated with an uplink channel between the UE and an access network entity; measuring one or more downlink channel metrics associated with a downlink channel between the UE and the access network entity; identifying an amount of downlink traffic and an amount of uplink traffic for communications between the UE and the access network entity; configuring, from a set of available antennas, a first subset of antennas for transmitting uplink communications to the access network entity based at least in part on the one or more uplink channel metrics; configuring, from the set of available antennas, a second subset of antennas for receiving downlink communications from the access network entity based at least in part on the first subset of antennas, the one or more downlink channel metrics, the amount of downlink traffic, and the amount of uplink traffic; and communicating with the access network entity using the first subset of antennas for uplink transmissions and the second subset of antennas for downlink transmissions.

Aspect 2: The method of aspect 1, wherein the one or more uplink channel metrics are identified based at least in part on a reference signal received power (RSRP) of one or more reference signals from the access network entity that is measured for each antenna of the set of available antennas.

Aspect 3: The method of aspect 2, wherein the RSRP is measured from one or more of a synchronization signal block (SSB), a tracking reference signal (TRS), a CSI reference signal, or any combinations thereof.

Aspect 4: The method of any of aspects 1 through 3, wherein the one or more downlink channel metrics include a channel capacity estimate associated with each antenna of the set of available antennas.

Aspect 5: The method of aspect 4, wherein the channel capacity estimate is based at least in part on a spectral efficiency measurement, a signal to noise measurement, or a reference signal received power (RSRP) measurement associated with each antenna of the set of available antennas.

Aspect 6: The method of any of aspects 1 through 5, wherein the second subset of antennas includes more antennas than the first subset of antennas, and where each of the antenna of the first subset of antennas is included in the second subset of antennas.

Aspect 7: The method of aspect 6, wherein the first subset of antennas are configured to include antennas of the set of available antennas that have more favorable uplink channel metrics, and one or more remaining antennas of the set of available antennas are configured for inclusion in the second subset of antennas based at least in part on respective downlink channel metrics.

Aspect 8: The method of aspect 7, wherein the one or more remaining antennas include a first antenna that is selected for inclusion in the second subset of antennas based at least in part on one or more combined metrics of the first antenna and one or more antennas of the first subset of antennas.

Aspect 9: The method of any of aspects 1 through 5, wherein the first subset of antennas includes a same number of antennas as the second subset of antennas, and wherein a same subset of antennas of the set of available antennas are configured for both the first subset of antennas and the second subset of antennas.

Aspect 10: The method of aspect 9, wherein the antennas of the same subset of antennas are configured based at least in part on a threshold value that is associated with a difference between the amount of downlink traffic and the amount of uplink traffic, and one or more of the uplink channel metrics, the downlink channel metrics, or a priority associated with the uplink communications and the downlink communications.

Aspect 11: The method of aspect 10, wherein the priority associated with the uplink communications and the downlink communications is selected based at least in part on a reference signal received power (RSRP) that is measured for one or more antennas of the set of available antennas.

Aspect 12: The method of any of aspects 9 through 11, wherein the antennas of the same subset of antennas are configured based at least in part on uplink channel metrics or downlink channel metrics, and a comparison of one or more linear combinations of uplink channel metrics and downlink channel metrics with a threshold.

Aspect 13: An apparatus for wireless communication at a UE, comprising a processor; memory coupled with the processor; and instructions stored in the memory and executable by the processor to cause the apparatus to perform a method of any of aspects 1 through 12.

Aspect 14: An apparatus for wireless communication at a UE, comprising at least one means for performing a method of any of aspects 1 through 12.

Aspect 15: A non-transitory computer-readable medium storing code for wireless communication at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   selecting a first subset of antennas for uplink transmission based at least in part on a first downlink channel metric associated with the first subset of antennas, the first downlink channel metric being related to channel strength;
   selecting a second subset of antennas for downlink reception based at least in part on a second downlink channel metric associated with the second subset of antennas, the second downlink channel metric being related to multiple-input multiple-output (MIMO) channel capacity and is different than the first downlink channel metric, wherein the second subset of antennas includes each antenna in the first subset of antennas; and
   communicating with an access network entity using the first subset of antennas for uplink transmissions and the second subset of antennas for downlink transmissions.

2. The method of claim 1, wherein the first downlink channel metric is identified based at least in part on a reference signal received power (RSRP) of one or more reference signals from the access network entity that is measured for each antenna of a set of available antennas at the UE.

3. The method of claim 2, wherein the RSRP is measured from one or more of a synchronization signal block (SSB), a tracking reference signal (TRS), a channel state information (CSI) reference signal, or any combinations thereof.

4. The method of claim 1, wherein the MIMO channel capacity is based at least in part on an estimated spectral efficiency (SPEF) and a channel state feedback (CSF) for a channel that uses the second subset of antennas.

5. The method of claim 1, wherein the second downlink channel metric includes a MIMO channel capacity estimate associated with each antenna of a set of available antennas at the UE.

6. The method of claim 5, wherein the MIMO channel capacity estimate is based at least in part on a spectral efficiency measurement, a signal to noise measurement, or a reference signal received power (RSRP) measurement associated with each antenna of the set of available antennas at the UE.

7. The method of claim 1, wherein the second subset of antennas includes more antennas than the first subset of antennas.

8. The method of claim 7, wherein the first subset of antennas include antennas that have more favorable uplink channel metrics, and one or more remaining antennas of a set of available antennas at the UE are selected for the second subset of antennas based at least in part on respective MIMO channel capacity.

9. The method of claim 8, wherein the one or more remaining antennas include a first antenna that is selected for inclusion in the second subset of antennas based at least in part on one or more combined metrics of the first antenna and one or more antennas of the first subset of antennas.

10. The method of claim 1, wherein the first subset of antennas includes a same number of antennas as the second subset of antennas, and wherein a same subset of antennas of a set of available antennas are configured for both the first subset of antennas and the second subset of antennas.

11. The method of claim 10, wherein the antennas of the same subset of antennas are selected based at least in part on a first difference between downlink MIMO channel capacities of antenna pairs selected according to one or more downlink metrics being less than a first threshold value, and a second difference between downlink channel strengths of antenna pairs selected according to one or more downlink metrics being less than a second threshold value.

12. An apparatus for wireless communication at a user equipment (UE), comprising:
at least one processor; and
at least one memory coupled with the at least one processor, the at least one memory storing instructions executable by the at least one processor to cause the apparatus to:
select a first subset of antennas for uplink transmission based at least in part on a first downlink channel metric associated with the first subset of antennas, the first downlink channel metric being related to channel strength;
select a second subset of antennas for downlink reception based at least in part on a second downlink channel metric associated with the second subset of antennas, the second downlink channel metric being related to multiple-input multiple-output (MIMO) channel capacity and is different than the first downlink channel metric, wherein the second subset of antennas includes each antenna in the first subset of antennas; and
communicate with an access network entity using the first subset of antennas for uplink transmissions and the second subset of antennas for downlink transmissions.

13. The apparatus of claim 12, wherein the first downlink channel metric is identified based at least in part on a reference signal received power (RSRP) of one or more reference signals from the access network entity that is measured for each antenna of a set of available antennas at the UE.

14. The apparatus of claim 13, the first downlink channel metric is identified based at least in part on a reference signal received power (RSRP) of one or more reference signals from the access network entity that is measured for each antenna of a set of available antennas at the UE.

15. The apparatus of claim 12, wherein the MIMO channel capacity is based at least in part on an estimated spectral efficiency (SPEF) and a channel state feedback (CSF) for a channel that uses the second subset of antennas.

16. The apparatus of claim 12, wherein the second downlink channel metric includes a MIMO channel capacity estimate associated with each antenna of a set of available antennas at the UE.

17. The apparatus of claim 16, wherein the MIMO channel capacity estimate is based at least in part on a spectral efficiency measurement, a signal to noise measurement, or a reference signal received power (RSRP) measurement associated with each antenna of the set of available antennas at the UE.

18. The apparatus of claim 12, wherein the second subset of antennas includes more antennas than the first subset of antennas.

19. The apparatus of claim 18, wherein the first subset of antennas include antennas that have more favorable uplink channel metrics, and one or more remaining antennas of a set of available antennas at the UE are selected for the second subset of antennas based at least in part on respective MIMO channel capacity.

20. The apparatus of claim 19, wherein the one or more remaining antennas include a first antenna that is selected for inclusion in the second subset of antennas based at least in part on one or more combined metrics of the first antenna and one or more antennas of the first subset of antennas.

21. The apparatus of claim 12, wherein the first subset of antennas includes a same number of antennas as the second subset of antennas, and wherein a same subset of antennas of a set of available antennas are configured for both the first subset of antennas and the second subset of antennas.

22. The apparatus of claim 21, wherein the antennas of the same subset of antennas are selected based at least in part on a first difference between downlink MIMO channel capacities of antenna pairs selected according to one or more downlink metrics being less than a first threshold value, and a second difference between downlink channel strengths of antenna pairs selected according to one or more downlink metrics being less than a second threshold value.

23. An apparatus for wireless communication at a user equipment (UE), comprising:
means for selecting a first subset of antennas for uplink transmission based at least in part on a first downlink channel metric associated with the first subset of antennas, the first downlink channel metric being related to channel strength;
means for selecting a second subset of antennas for downlink reception based at least in part on a second downlink channel metric associated with the second subset of antennas, the second downlink channel metric being related to multiple-input multiple-output (MIMO) channel capacity and is different than the first downlink channel metric, wherein the second subset of antennas includes each antenna in the first subset of antennas; and
means for communicating with an access network entity using the first subset of antennas for uplink transmissions and the second subset of antennas for downlink transmissions.

24. The apparatus of claim 23, wherein the first downlink channel metric is identified based at least in part on a reference signal received power (RSRP) of one or more reference signals from the access network entity that is measured for each antenna of a set of available antennas at the UE.

25. The apparatus of claim 23, wherein the MIMO channel capacity is based at least in part on an estimated spectral efficiency (SPEF) and a channel state feedback (CSF) for a channel that uses the second subset of antennas.

26. The apparatus of claim 23, wherein the second subset of antennas includes more antennas than the first subset of antennas.

27. The apparatus of claim 23, wherein the first subset of antennas includes a same number of antennas as the second subset of antennas, and wherein a same subset of antennas of a set of available antennas are configured for both the first subset of antennas and the second subset of antennas.

28. A non-transitory computer-readable medium storing code for wireless communication at a user equipment (UE), the code comprising instructions executable by at least one processor to:
select a first subset of antennas for uplink transmission based at least in part on a first downlink channel metric associated with the first subset of antennas, the first downlink channel metric being related to channel strength;
select a second subset of antennas for downlink reception based at least in part on a second downlink channel metric associated with the second subset of antennas, the second downlink channel metric being related to multiple-input multiple-output (MIMO) channel capacity and is different than the first downlink channel metric, wherein the second subset of antennas includes each antenna in the first subset of antennas; and communicate with an access network entity using the first subset of antennas for uplink transmissions and the second subset of antennas for downlink transmissions.

29. The non-transitory computer-readable medium of claim 28, wherein the first downlink channel metric is identified based at least in part on a reference signal received power (RSRP) of one or more reference signals from the access network entity that is measured for each antenna of a set of available antennas at the UE.

30. The non-transitory computer-readable medium of claim 28, wherein the MIMO channel capacity is based at least in part on an estimated spectral efficiency (SPEF) and a channel state feedback (CSF) for a channel that uses the second subset of antennas.

* * * * *